(No Model.)
J. A. LIDBACK.
RAILWAY GATE.
No. 345,239. Patented July 6, 1886.
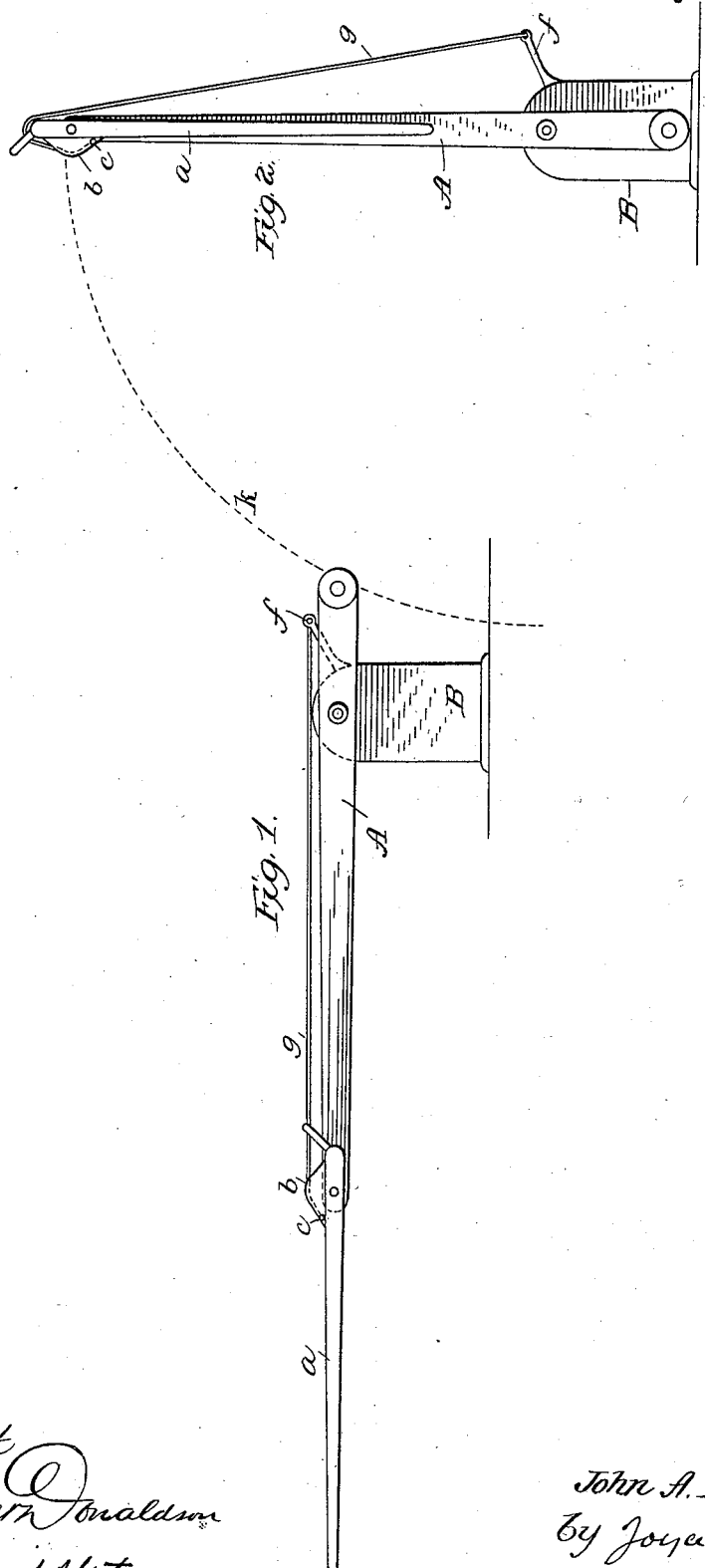
Attest
H. Allen Donaldson
F. L. Middleton
Inventor
John A. Lidback
by Joyce & Spear
Att'ys

UNITED STATES PATENT OFFICE.

JOHN A. LIDBACK, OF PORTLAND, MAINE, ASSIGNOR OF ONE-HALF TO J. J. GERRISH, OF SAME PLACE.

RAILWAY-GATE.

SPECIFICATION forming part of Letters Patent No. 345,239, dated July 6, 1886.

Application filed August 14, 1885. Serial No. 174,416. (No model.)

*To all whom it may concern:*

Be it known that I, JOHN A. LIDBACK, of Portland, in the county of Cumberland and State of Maine, have invented a new and useful Improvement in Railway-Gates; and I do hereby declare that the following is a full, clear, and exact description of the same.

My invention relates to railway-gates of that class in which a vertically-swinging bar is used to lower across the roadway by the side of the track.

The object of my invention is to provide an extension to the ordinary bar capable of folding when the bar is raised and of extending when the bar is lowered, whereby the length of the bar is greatly lessened, and it is made more easy to operate and it is less liable to injurious effect by the wind.

My invention is illustrated in the accompanying drawings, in which Figure 1 shows an ordinary bar with the improved bar attached in a horizontal position. Fig. 2 shows the same in an elevated position.

In the drawings, A represents the vertically-swinging bar, pivoted upon a suitable post, B, and adapted to be moved by any suitable mechanism. When removed out of the way, these bars stand in a vertical position, as shown in Fig. 2, and when obstructing the way they are lowered to a horizontal position, as shown in Fig. 1. Where the bars are made long enough to reach to the middle of an ordinary roadway there must be a considerable length, which acts with increased leverage upon the mechanism by which it is hoisted and lowered, and it also presents greater surface under greater leverage to the wind when the post is raised. To overcome these difficulties I have provided upon the free end of the bar a pivoted extension-arm, *a*, which is pivoted to move in the same vertical plane in which the main bar A moves, and is adapted to be swung outward into line with the main bar, forming an extension thereof, or to swing inward and to fold. The mechanism, however, moving the extension and swinging bar *a* is operated by the movement of the main bar A.

Upon the pivoted end of the extension-bar *a* is fixed a triangular standard, *b*, preferably grooved on its upper edge. To this upper edge, near the bar, at a point indicated at *c*, is attached a wire, rope, or chain, *g*, which passes over the grooved top and through a slot in a guide-standard fixed to an extreme rear end of the extension-bar *a*, and thence said cord, rope, or chain runs to an arm, *f*, on the base or standard, to which the main bar A is pivoted. The movement of the bar *a* is through the arc shown by dotted line *k*.

It will be apparent that by reason of the distance between the point of attachment of the wire, rope, or chain to the arm *f* and the pivotal point of the main bar A, when the bar A is lowered, the distance between the arm *f*, where one end of the wire *g* is secured, and the point *c*, where the other end is held, will increase, and in proportion to this increase the wire *g* will draw upon the bar *a*, and thus swing said bar upward and outward as the main bar descends, causing it to assume a horizontal position.

The parts are so adjusted to each other that when the main bar is lowered the supplemental bar *a* will be in line with it. When the main bar is raised, the supplemental bar drops by its own weight. Thus at the same time the leverage is materially lessened in raising and lowering, and the length of the bar when raised is materially less.

I do not confine myself to the means shown for raising and lowering automatically the extension-arm, as many other devices may be used for the purpose.

I claim as my invention—

1. In combination with the main bar A of a railway-gate, a supplemental bar, *a*, pivoted upon the free end thereof, and means, substantially as described, connected to the pivoted bar, for swinging it as the gate rises or falls.

2. In combination, the main bar A, the supplemental bar *a*, pivoted thereon, and the wire rope or chain connected to the standard on the supplemental bar and to an arm on the main base or post, all substantially as described.

In testimony whereof I have signed my name to this specification in the presence of two subscribing witnesses.

JOHN A. LIDBACK.

Witnesses:
JOHN A. HAYDEN,
I. B. WEBB.